Patented Dec. 21, 1937

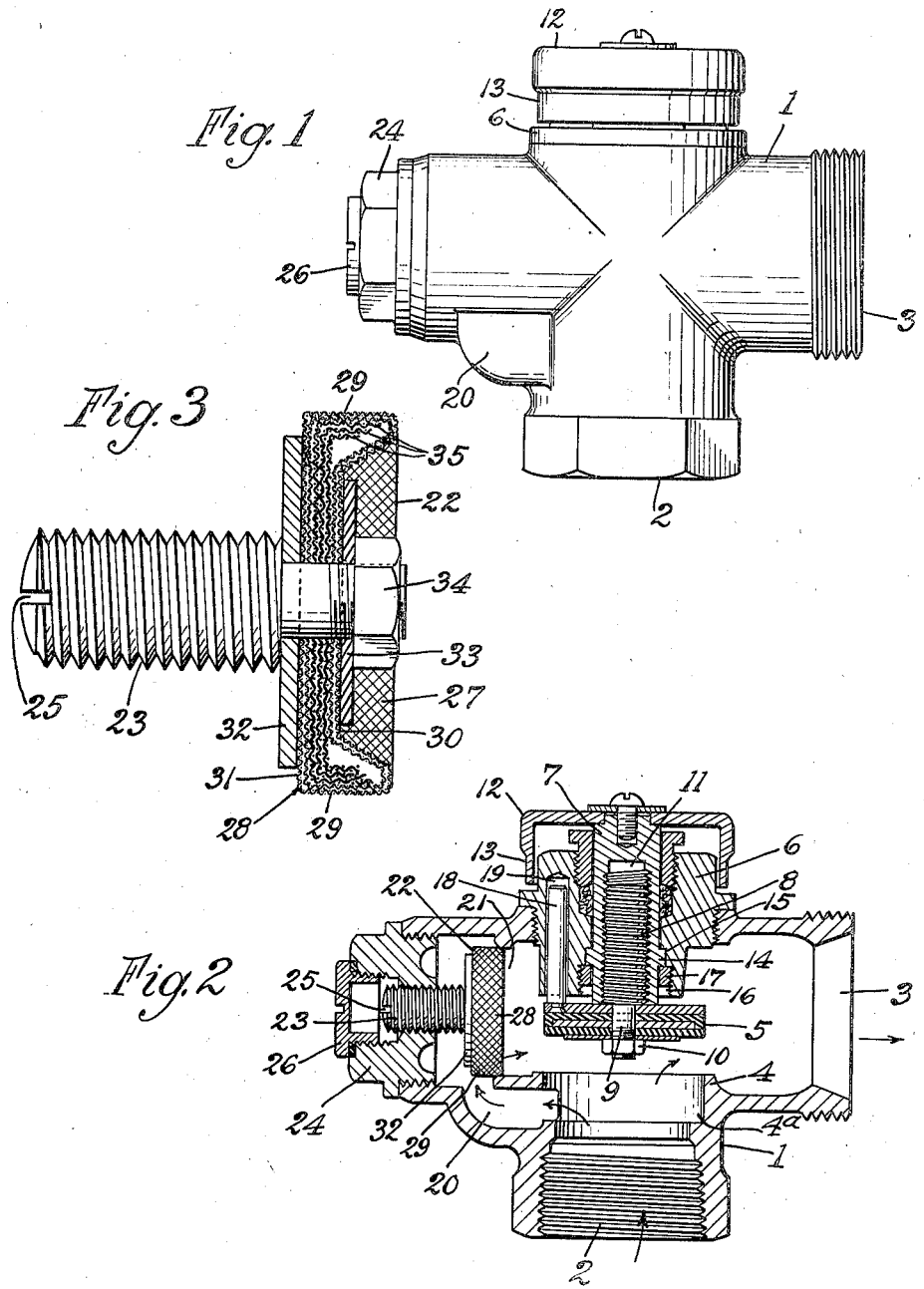

2,102,856

UNITED STATES PATENT OFFICE 2,102,856

VALVE

Irving H. Russell, Chicago, Ill., assignor to Sloan Valve Company, Chicago, Ill., a corporation of Illinois Application October 11, 1933, Serial No. 693,126

10 Claims. (Cl. 137—111)

This invention relates to valves and has for its object to provide a new and improved device of this description. The invention has as a further object to provide a combination shut off and throttle valve. The invention has a further object to provide a valve which can be used both on high pressure and low pressure systems. The invention has as a further object to provide a silent throttling valve. The invention has further objects which are more particularly pointed out in the accompanying description.

Referring now to the drawing, Fig. 1 is a view of one form of valve embodying the invention;

Fig. 2 is a vertical sectional view therethrough;

Fig. 3 is an enlarged sectional view through the throttling valve.

Like numerals refer to like parts throughout the several figures.

In the construction shown the valve is provided with a casing 1 having an inlet 2 and an outlet 3. The inlet 2 is provided with a valve seat 4. A main valve member 5 is movably mounted in position so that it may be down on the valve seat 4 to close the inlet. This valve may be mounted in any desired manner.

As herein shown it is mounted in a plug 6 screw threaded into the casing 1. The valve 5 is provided with a stem which consists of two parts, a part 7 which passes through an opening in the plug 6 and a threaded part 8 which is connected with the valve member 5 in any desired manner, as by means of the reduced portion 9 and the nut 10. The threaded part 8 works in a threaded opening 11 in the part 7 of the stem. The part 7 of the stem is rotatable and is provided with a hand piece 12 for this purpose which has its edge 13 bent downwardly over the upper end of the plug 6. The part 7 of the stem has a collar or annulus 14 which works in a groove 15 in the plug 6 so that while the part 7 may be rotated it will not move longitudinally.

For purposes of assembly the groove 15 is enlarged at its lower end 16 and a screw threaded ring 17 surrounds the part 7 of the stem and engages the lower face of the annulus 14, as clearly shown in Fig. 2. The valve member 5 and the part 8 of the valve stem is prevented from rotating when the stem portion 7 is rotated so that its motion is confined to a longitudinal in and out motion. This is secured by providing a pin 18 which is connected with the valve member and which slides in a recess 19 in the plug 6. It will be seen that when the stem section 7 is rotated the threaded section 8 of the stem will be moved toward or from the seat 4, but will not be rotated.

The valve member 5, therefore, may be moved against the valve seat 4 to entirely shut off the flow of the water between said valve seat and the valve member. Connected with the inlet 2 below the valve seat 4 is a bypass 20 which leads to an opening 21 communicating with the interior of the valve casing and with the outlet 3. Slidably mounted in this opening 21 is a throttle member 22 which is connected with a threaded stem 23 working in a threaded opening in a plug 24. The end of the threaded member is provided with a tool notch 25 and is normally covered up by the plug 26. Forming a part of this throttle member 22 is a cartridge 27 which is made up of a screen device having small openings which permit water to pass therethrough.

This screen device may be made in any desired manner and as herein shown consists of a main member 28, see Fig. 3, which has a cylindrical form with a periphery 29 and the bent edges 30 and 31 which are clamped between the members 32 and 33 by means of a nut 34 on the reduced end of the stem 23. This screen member is preferably made up of a double layer of fine screen and there is also preferably on the interior thereof a plurality of screen members 35. It will be seen that by moving the throttling member inwardly in the opening 21, the portion of the screen through which the water can pass is decreased so as to reduce the amount of water passing therethrough. When the throttling device is moved outwardly the water passes through a greater portion of the screen, and hence more water can pass therethrough.

When the valve is used on a low pressure system the valve member 5 is opened and the water passes through the inlet and between the valve seat 4 and then the valve member 5 and out the outlet. When the valve is used on a high pressure system the valve member 5 is entirely closed by being moved opposite the valve seat 4, but not enough to close off the bypass 20 and the water passes through the bypass 20 and through the throttling member 22, passing through the screen and through the opening 21 and then out the outlet 3. It will be seen that by means of this device the water can be properly controlled for the high pressure so that the proper amount will pass through the valve. By moving the valve 5 down upon the top of the valve seat 4a the bypass 20 is closed. I have therefore here a combination shut off and throttle valve which eliminates objectionable line noise at any pressures. When it is wide open, as for low pressure, it has a full free water way. For higher pressures it has a throttled water way, the water being diverted through the bypass and through the throttling device which prevents all noise and splashing. This throttle member is easily removable for cleaning by simply unscrewing the plug 24, the throttle member coming out with the plug. It can then be easily cleaned or repaired or replaced. In order to clean the valve 28 the valve 5 is moved down on to the seat 4a so as to entirely shut off the water passing through the casing. This construction makes it unnecessary to shut off the water in the main when it is desired to clean this valve. The main valve 5 may also be used to regulate the water passing through the bypass 20, by moving it partially across the mouth of said bypass. It will further be noted that there are two inlets to the casing, one controlled by the valve 5 and the other controlled by the valve 28, and that the water which passes through the valve 28 passes by the valve 5 on its way to the outlet 3.

I claim:

1. In combination, a casing having a passageway for liquid therethrough, a throttle device adjustable in said passageway, said throttle device being subject to material impairment when the liquid throttled thereby contains foreign matter, and a protecting hollow cylinder in said casing opening into said passageway into which said throttle member may be temporarily withdrawn out of the path of flow when the supplied liquid contains foreign matter.

2. In combination, a throttle casing having a cylindrical opening therein and an outlet opening, one end of said cylindrical opening being in communication with said outlet opening, the said one end of said opening being provided with an internal annular shoulder, an inlet passageway opening into said cylindrical opening along the side thereof adjacent said shoulder, a throttle member lying within said cylindrical opening and adjustable longitudinally thereof into a variable throttling relationship with said shoulder to throttle the passage of fluid from said inlet passageway to the said outlet, said throttle member being susceptible of material impairment from foreign matter in the event that any is contained in the fluid throttled thereby, said cylinder being of such length with respect to the dimensions of said throttle member that the throttle member may be adjusted to the end of the cylinder away from said shoulder in which position it is protected from foreign matter by the cylinder and is out of the line of flow extending between the inlet passageway and the opening through the shoulder.

3. In combination, a valve casing having an inlet opening and an outlet opening, parallel passageways within said casing extending between said openings, and a valve member reciprocably mounted in said casing to control communication through said passageways; said passageways being so related to the positions of said valve member that both passageways are blocked when the valve member is adjusted to one extreme position, one passageway is blocked and the other unblocked when the valve member is adjusted to an intermediate position, and both passageways are unblocked when the valve element is adjusted to the other extreme position.

4. In combination, a valve casing having an inlet opening and an outlet opening, parallel passageways within said casing extending between said openings, a valve member reciprocably mounted in said casing to control communication through said passageways; said passageways being so related to the positions of said valve member that both passageways are blocked when the valve member is adjusted to one extreme position, one passageway is blocked and the other unblocked when the valve member is adjusted to an intermediate position, and both passageways are unblocked when the valve element is adjusted to the other extreme position; and an additional member adjustably disposed in said casing to throttle one of said passageways.

5. In combination, a casing having a first arm and a second arm disposed opposite to one another and in axial alignment, said casing having a third arm and a fourth arm lying in a common plane perpendicular to the axis of the first two arms, each of said arms having a longitudinal opening therethrough, said casing having a central chamber placing all said arm openings in communication with each other, a member mounted within the opening through the first arm and adjustable longitudinally of such opening to throttle the communication between the opening through the second arm and the central opening, a member mounted in the opening in the third arm and adjustable longitudinally thereof to throttle communication between the third-arm opening and the central opening, a by-pass channel extending from an intermediate portion of the opening in the second arm to an intermediate portion of the opening in the third arm, and connection facilities forming part of the second and fourth arms to enable the casing to be interposed in a fluid-supply line.

6. In combination, a casing having a first arm and a second arm disposed opposite to one another and in axial alignment, said casing having a third arm and a fourth arm, each of said arms having a longitudinal opening therethrough, said casing having a central chamber placing all said arm openings in direct communication with each other, a member mounted within the opening through the first arm and adjustable longitudinally of such opening to throttle the communication between the opening through the second arm and the central opening, a member mounted in the opening in the third arm and adjustable longitudinally thereof to throttle communication between the third-arm opening and the central opening, a by-pass channel extending from an intermediate portion of the opening in the second arm to an intermediate portion of the opening in the third arm, and connection facilities forming part of the second and fourth arms to enable the casing to be interposed in a fluid-supply line.

7. In combination, a casing having an inlet opening and an outlet opening communicating with each other through a central chamber, the communication between one of said openings and said central chamber being by way of a cylindrical passage of larger diameter than the associated opening, the outer end of said passage being defined by an annular shoulder surrounding the associated opening, a by-pass channel extending from an intermediate portion of said cylindrical portion to said central opening, and a valve member of such a size to fit closely within said cylindrical passage, said valve member being adjustable to one position to seat against said shoulder to block communication between the inlet and outlet openings, adjustable to another position to close the inner end of said cylindrical passage while permitting inter-opening communication by way of said by-pass channel, and adjustable to a position within said central chamber to permit further inter-opening communication through the entire length of said cylindrical passage.

8. In a compression angle valve having an inlet opening and an outlet opening in the casing and having the bonnet located opposite one of said openings, there being an annular seat shoulder located around said opening opposite the bonnet to receive the compression valve member, a second annular shoulder around such opening spaced inwardly of the first and of sufficient internal diameter to permit the valve member to slide through it while effectively closing the passage therethrough, and a by-pass channel extending laterally from a point between said shoulders to the opposite opening.

9. In combination, a valve casing provided with an inlet opening and an outlet opening in communication with each other through an enlarged central chamber, a reciprocable valve member mounted within said casing to control communication between said openings, a first shoulder and a second shoulder within said casing interposed between one of said openings and the said central chamber; and a channel in said casing by-passing one of said shoulders, said valve member being positionable with respect to one of said shoulders to close communication completely between said openings, being positionable within the second shoulder to permit by-pass communication between said openings, and positionable away from both of said shoulders to permit free communication between said openings.

10. In combination, a valve casing provided with an inlet opening and an outlet opening in communication with each other through an enlarged central chamber, a reciprocable valve member mounted within said casing to control communication between said openings, a first shoulder and a second shoulder within said casing interposed between one of said openings and the said central chamber; a channel in said casing by-passing one of said shoulders, said valve member being positionable with respect to one of said shoulders to close communication completely between said openings, being positionable within the second shoulder to permit by-pass communication between said openings, and positionable away from both of said shoulders to permit free communication between said openings; and an adjustable throttle device controlling the by-pass channel.

IRVING H. RUSSELL.